United States Patent [19]

Yi et al.

[11] Patent Number: 5,439,992
[45] Date of Patent: Aug. 8, 1995

[54] CONTINUOUS PROCESS FOR MAKING MELT-PROCESSABLE OPTICAL GRADE RING-OPENED POLYCYCLIC (CO)POLYMERS IN A SINGLE-STAGE MULTI-ZONED REACTOR

[75] Inventors: Kong S. Yi, Marietta, Ga.; Linwood P. Tenney, Birmingham, Ala.; Parley C. Lane, Jr., Cuyahoga Falls, Ohio; John V. Wessel, Independence, Ohio; Nancy S. Marchant, Brunswick, Ohio

[73] Assignee: The B. F. Goodrich Company, Brecksville, Ohio

[21] Appl. No.: 254,381

[22] Filed: Jun. 6, 1994

Related U.S. Application Data

[60] Continuation-in-part of Ser. No. 48,621, Apr. 16, 1993, Pat. No. 5,319,034, which is a continuation of Ser. No. 845,207, Mar. 3, 1992, Pat. No. 5,206,306, which is a division of Ser. No. 331,330, Mar. 31, 1989, abandoned.

[51] Int. Cl.$^6$ ............................................ C08F 232/08
[52] U.S. Cl. ........................................ 526/73; 525/338; 525/332.1; 526/160; 526/281; 526/283
[58] Field of Search ................... 526/160, 73, 281, 283

[56] References Cited

U.S. PATENT DOCUMENTS

| | | |
|---|---|---|
| 3,557,072 | 1/1971 | Verne et al. |
| 4,136,247 | 1/1979 | Tenney et al. |
| 4,136,248 | 1/1979 | Tenney . |
| 4,136,249 | 1/1979 | Tenney et al. |
| 4,178,424 | 12/1979 | Tenney et al. |

FOREIGN PATENT DOCUMENTS

| | | |
|---|---|---|
| 58-43412 | 9/1983 | Japan . |
| 60-26024 | 2/1985 | Japan . |

OTHER PUBLICATIONS

Chemical Abstract 107:9784n. Acrylic Polymers for Optical Materials (1988).

*Primary Examiner*—Bernard Lipman
*Attorney, Agent, or Firm*—Alfred D. Lobo; Nestor W. Shust

[57] ABSTRACT

A continuous process for the solution polymerization of appropriate polycycloolefins in a ROMP zone to obtain a processable ROMP homo- or copolymer in solution, and subsequent hydrogenation of the ROMP (co)-polymer without removing the residual ROMP catalyst and co-catalyst, provides an optical product having a mol wt $M_w$ in the range from 50,000–300,000 and polydispersity $M_w/M_n$ in the range from 1.3–5.0, more preferably from 1.3–3, the lower the polydispersity the more desirable the physical properties of the (co)-polymer. The process comprises, (A) continuously polymerizing a substantially anhydrous solution of said monomer by ring opening metathesis polymerization in at least a first and a last reaction zone of a multi-zoned, single-stage, reaction vessel to form an unsaturated polymer cement essentially free of unreacted monomer; (B) hydrogenating said unsaturated polymer cement in the presence of an effective amount of a nickel-containing hydrogenation catalyst in an amount sufficient to produce a hydrogenareal cement wherein more than 97% of double bonds in said unsaturated polymer are converted to single bonds; (C) removing more than 99% by weight of spent polymerization catalyst, used hydrogenation catalyst and filter aid present in said hydrogenated cement to produce an essentially solids-free hydrogenated cement; (D) devolatilizing said solids-free hydrogenated cement to produce a thickened hydrogeneated polymer cement, and, (E) recovering a solid polymer which meets particle count specifications for optical grade polymer.

10 Claims, 2 Drawing Sheets

CONTINUOUS PROCESS FOR MAKING MELT-PROCESSABLE OPTICAL GRADE RING-OPENED POLYCYCLIC (CO)POLYMERS IN A SINGLE-STAGE MULTI-ZONED REACTOR

BACKGROUND OF THE INVENTION

Cross-reference to related references: This application is a continuation-in-part U.S. application of Ser. No. 08/048,621 filed Apr. 16, 1993, now U.S. Pat. No. 5,319,034, which is a continuation of U.S. Ser. No. 07/845,207 filed on Mar. 3, 1992 now U.S. Pat. No. 5,206,306 which in turn is a divisional application of U.S. Ser. No. 07/331,330 filed Mar. 31, 1989, now abandoned.

The art of ring-opening metathesis polymerization (referred to as "ROMP") is well known (see, for example, "Encyclopedia of Polymer Science and Engineering", 2nd Ed., H. F. Mark, et al., Ed., John Wiley and Sons, New York, 1987, Vol. 9, pages 634–668), and a variety of polymers have been obtained by this method. For example, U.S. Pat. Nos. 4,069,376, 4,110,528, 4,136,247, 4,136,248, 4,136,249, and 4,178,424, all assigned to the B. F. Goodrich Company, describe such polymers and their methods of preparation.

During the past decade, many attempts have been made to provide a viable continuous polymerization process to make ring-opened thermoplastic polymers of cyclic and polycyclic olefin monomers with the justifiable expectation that one skilled in the art should be able to do so with the usual trial and error.

This application is specifically directed to the continuous polymerization and subsequent hydrogenation, filtration and devolatilization of homopolymers and copolymers (together referred to as "(co)polymers") of particular polycycloolefins, and presents evidence that the expectation was unjustified. By "homopolymer" we refer to a polymer in which a polymer chain has in excess of 95%, generally more than 97%, of the repeating units are of one monomer, or its isomer. By "monomer" we refer to a multi-ringed monoolefinically unsaturated cycloolefin monomer having at least two rings and no more than four fused rings. A monomer having (i) two rings is exemplified by norbornene, bicyclo[2.2.1.]hept-2-ene or "NB" for brevity, and substituted embodiments thereof, such as 5-ethylidenenorbornene or 5-methylnorbornene, particularly those monomers of NB having at least one substituent in the 5- (and/or 6-) positions, referred to as "NB monomers"; (ii) three rings is exemplified by dicyclopentadiene (DCPD) and substituted DCPDs; (iii) four rings is exemplified by tetracyclododecene (TD) and substituted TDs. Such monomers, collectively referred to herein as "norbornene-type" (NB-type) monomers, for convenience, because, just as in a polymer of NB, or substituted-NB, each NB-type polymer is characterized by containing a repeating unit resulting from a ROMP polymerized derivative of NB. A first NB-type or NB monomer may be polymerized by coordination polymerization to form (i) a ROMP homopolymer; or, (ii) with a second NB-type or NB monomer, a ROMP NB-type copolymer, the molar proportion of one relative to the other being arbitrary.

Evidence that most batch ROMP processes provide neither short residence time (per pass throughput time), nor essentially complete conversion of comonomers charged to a reactor, is provided in U.S. Pat. No. 5,191,026 to Nishi et al, which is directed to the batch copolymerization and subsequent hydrogenation of TD, DCPD, and other NB-type monomers including their alkyl substituted derivatives. By "essentially complete conversion" we refer to the conversion of at least 95% of all (co)monomers, preferably more than 99% conversion. The examples in this patent show polymer yields of 60–80% by weight ("wt") of the initial monomer charge obtained for a batch polymerization time of 2 hours. The $T_g$'s of the hydrogenated copolymers were in the range 93°–163° C., depending on the monomers used.

Interest in copolymers of specific polycyclic olefinically unsaturated monomers has resulted in the disclosure of continuous processes for their production because a continuous process is deemed most economic to make the production of such copolymers on a large scale. In particular, U.S. Pat. No. 4,239,874 to Ofstead et al teaches the production of "gel-free" rubbery copolymers of a major amount by wt of cyclopentene and a little DCPD, the ratio of cyclopentene to DCPD accounting for the elastomeric product. Globules of crosslinked polymer are referred to as "gel".

In the aforementioned '874 patent there was no limitation relating to molecular weight ("mol wt") distribution so the reaction could proceed with residence times in excess of 30 min. Because he required a total absence of dienes to avoid coping with any resulting gel, the clear implication was that the presence any diolefin could not be tolerated. Further, to minimize gel formation, Ofstead relied on initially charging 15% to 30% cyclopentene and less than 3% DCPD—a recipe calculated to result in extremely long residence times. There was no reason for one to consider the upper limit of tolerance for a gel, or to test if a limited amount of gel, up to 1%, could be tolerated, based on the expectation that it would be removed in one or more pre-polishing filtration stages. Despite resulting in a residence time of up to 6 hr he states that "steady state condition of the continuous reaction phase was achieved after a total of about six hours of reactor operation." (col 8, lines 43–45). Further, there is no criticality relating to the order of addition of the (co)monomers and catalyst components. The catalyst components, namely an organo (N, P or As) molybdate, metal halide, or metal oxyhalide in combination with an alkylaluminumhalide co-catalyst, are together referred to as the "ROMP catalyst system".

Ofstead failed to recognize that, if he had only chosen those NB-type monomers which liberate heat in an appropriate range, yet afford a reaction mixture of desirable viscosity, he could control the temperature and speed of the reaction by the rate of addition of the catalyst he used, and also, the location of such addition, if he had used a zoned reactor. He likewise failed to recognize, again with such monomers, that addition of a small quantity of a chain transfer agent (sometimes loosely referred to as a molecular weight modifier), such as a $C_4$–$C_7$ alkene would at the same time, provide a narrowly defined molecular weight, and modulate both the speed of the reaction and the temperature profile within the reactor.

A (co)polymer product of specific interest to those who wish to make optical substrates, for example, compact discs, are the ROMP (co)polymers of polycycloolefins containing a repeating unit of ring-opened NB because of the unique and desirable optical properties of these (co)polymers. It is well known however, that such properties in a substrate for an optical disc are as difficult to achieve as they are desirable. The strict requirements of such a substrate are documented in the '041 patent. In particular, the preferred hydrogenated substrates have (a) a glass transition temperature ($T_g$) in the range from 120°–200° C., (b) are characteristically, essentially completely transparent, that is, permeable to visible light, (c) low birefringence in the range from 10–60 nm, and (d) a melt-flow index in the range from 40 g–65 g per 10 min for 1220 gm at a temperature of 300° C. under a load of 1.2 Kg. Lower quality than optical grade polymer may be produced by the process for other applications where thermoformability, especially by extrusion or injection molding, of an essentially clear and water-white (colorless) polymer is desired, but the criteria for acceptability of the product are less strict than those for an optical disk or fiber. Such less strict uses for clear polymer are for the faces of clocks, side windows in automobiles, lenses for lights on automobiles and trucks, sun-roofs for automobiles, and for medical instruments which are steam sterilizable.

Several other patents and publications, e.g. Japanese Kokai Patent No. 60[1985]-26034, refer to the desirable optical properties of these polymers without defining either all the critical requirements which make the polymers fit for their chosen purpose, or all the process conditions which are required to produce them. For example, it is critical that optical grade polymers have a narrow molecular weight (mmol wt) distribution $M_w/M_n<5$, most preferably $<3$ (see U.S. Pat. No. 5,034,482 to Kohara et al. and U.S. Pat. No. 5,061,771 to Oshima et al). From tests with various comonomers Tenney et al found that TD, despite its high cost, and other materials used in the illustrative examples of the Kokai '034, did not provide satisfactory optical properties (col 2, lines 17–19) because evidently, neither Tenney et al nor Goto et al fully appreciated the criticality of all the process requirements.

Since TD and other polycyclic olefins containing a NB moiety are indeed expensive materials, it is essential in an economical process, to minimize processing costs for making the polymers. One skilled in the art will recognize that the most likely way of meeting this goal is by using a continuous process, which one would expect to be faster and more efficient, provided of course, the process reliably produces a polymer of the required optical grade. Testimony, in numerous references, as to the difficulty of providing such a continuous process is the profusion of illustrative examples made exclusively by batch processes.

Evidence that Tenney et al expected to provide a continuous process with no more than routine engineering skills, is their teaching in EP application 0 303 246 that these copolymers may be produced in a continuous polymerization process, if desired (page 4, line 42). However, their copolymers were evidently made in a batch reactor, and the polymers obtained from the first step are hydrogenated in a second step after the polymer was either separated from the ring-opening catalyst, or diluted with cyclohexane after being removed from the polymerization zone. That Tenney et al's stated expectation relating to a continuous process enabled with only routine engineering skills, was both premature and off the mark, will presently be even more evident from their having missed the essential facts recounted hereafter.

Since the hydrogenated (co)polymer is to be made directly and continuously in this two-step process, all the components of the ROMP catalyst system used in the polymerization (first step of the continuous process) are necessarily present in the hydrogenation second step. This requires that the hydrogenation catalyst be effective in the presence of the residue of the "spent" (because it cannot be reused) ROMP catalyst system. Clearly, only specific ROMP catalysts will provide the requirements of a sufficiently "hot" catalyst to maintain the desired temperature, and, at the same time, not poison the hydrogenation catalyst sufficiently to affect hydrogenation adversely.

U.S. Pat. No. 5,053,471 to Goto et al describes a polymerization process which states that the two-step process, namely, polymerization and subsequent hydrogenation, may be carried out continuously. Though their disclosure states "Therefore, these two steps can be effected continuously without separating the ring-opening (co)polymer after the ring opening polymerization reaction." (col 14, lines 61–63), the polymer must first be separated from the ROMP catalyst before the polymer is hydrogenated. In example 1 they start with 50 g of monomer and recover 45 g of polymer. In example 10, 20 g of this polymer was dissolved in toluene and hydrogenated with a nickel naphthenate catalyst. To make the separation, a mixture of 'good' and 'poor' solvents which are mutually miscible, is used. To remove the first catalyst, a dilute aqueous organic acid is used, then "the organic layer is, . . . subjected to a conventional polymer recovery step to isolate a polymer freed of the polymerization catalyst." Clearly, the '471 process is not continuous, and the only enabling disclosure specifically teaches that the ROMP catalyst must be removed before the polymer is hydrogenated.

The problems to be overcome in a continuous process for polymerizing polycycloolefins successfully enough to provide a marketable optical substrate, are manifold, as pointed out in the '041 patent. Perhaps because of the difficulty of carrying out a continuous highly exothermic polymerization process, per se, there was good reason to eschew consideration of other facets of the overall process. Thus the advantage of hydrogenating the copolymer directly from a polymerization zone, and continuously, without removing either the ROMP catalyst, or, the chlorine ions generated, was never realized, even if it was not overlooked.

Chlorine ions are generated by two chlorine-generating components, (i) the catalyst, typically molybdenum pentachloride ($MoCl_5$) or tungsten hexachloride ($WCl_6$), and, (ii) the co-catalyst, typically an organoaluminumhalide such as ethylaluminum sesquichloride (EASC). Since it is well known that chlorine, whether as free Cl, HCl or Cl$^-$ is detrimental to the efficiency of a hydrogenation catalyst, particularly a nickel catalyst, there was no reason to consider flowing the Cl-containing ROMP polymerization reaction mass directly to the hydrogenation step. Nevertheless, fortuitously, it was both considered and done. Unexpectedly, the nickel hydrogenation catalyst used herein was not deleteriously affected by the chlorine. Hydrogenation catalyst recovered from the hydrogenated polymer may be reused, hence referred to as "used" catalyst. Reusing hydrogenation catalyst is particularly apt if a supported or "heterogeneous" nickel catalyst is used, because it is recovered and recycled with the filter aid. Nevertheless, a "homogeneous" nickel catalyst is most preferably used herein, despite the greater difficulty of recovering it for reuse (relative to that with the heterogeneous catalyst) because it was found that its use allows hydrogenation at a lower pressure and temperature, thus essentially negating the isomerization which occurs with a heterogeneous nickel catalyst.

It happens that, among known commercially significant hydrogenation catalysts, Ni-based catalysts alone are relatively immune to low levels of chlorine and resist interaction with salts of Mo, W or Ti. However, it was found that the Ni-based catalysts, particularly in the presence of halogen ions or molybdate, have a proclivity to function as isomerization catalysts to form chains of low mol wt polymer. When any portion of the (co)polymer is isomerized it is thereafter difficult to hydrogenate. Therefore it was necessary to avoid such isomerization. We found that by continuously hydrogenating the reaction mass in two stages, in the first of which, hydrogen was slugged into the hydrogenation reactor (cylinder) and the hydrogenation carried out at relatively low temperature, below 80° C., we avoid isomerization. In the second stage, we completely hydrogenate essentially all double bonds in the (co)polymer. By "essentially all" we refer to at least 95%, and more preferably 99% or more. The foregoing technical facts relating to continuous hydrogenation could not be deduced from an obvious modification of the known batch process, or the known continuous processes.

Also overlooked was the criticality of the tiltration step which requires that the reaction mass be in the form of a relatively viscous "polymer cement" of hydrogenated polymer, yet be filterable through a 0.4 μm "polishing" filter to remove all particles larger than 0.4 μm, if the copolymer is to pass tests for optical grade polymer. The properties of the cement after it is hydrogenated were such that it was found necessary to filter it in multiple stages.

Since it is imperative that the end product of the solid optical copolymer be melt-processable, for example, so that it can be used to feed an injection molding machine, it is critical that pellets of product are uniformly imbued with the specified desirable properties. By "melt-processable" is meant that the mol wt is in the range from 30,000 to 500,000, more preferably, from 40,000 to 300,000, and the polymer is made by using a proportioned amount of olefin; if desired, even higher mol wts may be made which are not melt-processable. A melt-processable (co)polymer is preferably processable at a temperature in the range from about 120° C. to 200° C., more preferably in the range from about 130° C. to 175° C.

The optimum combination is that of high mol wt and low processing temperature since hydrogenated high mol wt (co)polymers have desirably high $T_g$s, and a low processing temperature makes for easy thermoformability. The ease with which a melt-processable homo- or copolymer is made, is a function of the characteristics of the particular cycloolefin species being (co)polymerized. When too much solvent is present, removal of excess solvent at elevated temperature results in the powder product having exaggerated birefringence because there is stratification or fractionation of the copolymer while the solvent is being removed. The result is that both, the mol wt distribution and the dispersivity (or "polydispersity") in the polymer product is adversely affected. The additional risk is that over-dilution tends to carry over micron-size particles of gel. If >0.5% gel by wt remains in the polished polymer cement, the gel will be present after the solvent is volatilize. When the gel-containing powder is milled, pellets of the powder will be found unacceptable.

One skilled in the art immediately recognizes that a continuous chemical reaction to make a product is the assembly-line technique of the chemical-process industries to provide all the expected benefits such as (a) uniformity of product; (b) elimination of a large batch reactor and the 'dead' time associated with charging and discharging it; and, (c) the skillful combination of steps which lend themselves to such combination without jeopardizing control of the process. But the accurate estimation of the many related risks of running a continuous process, both with respect to a relatively few unexpected benefits as well as to the many unexpected detriments, varies, depending upon the number of variables, the complexity of the process, and the dangers associated with that process.

Since this ROMP reaction is highly exothermic, it would be expected to proceed apace irrespective of the type of reactor in which the reaction is carried out. However, though one cannot reasonably predict whether a ROMP reaction could be controlled at the desired maximum speed, one can predict that the faster the reaction, the more difficult it's to control.

In a commercial continuous reactor it is essential that the reaction proceed at sufficient speed to make the process economical. Since a controllable ROMP reaction with the desired monomers, in a batch reactor, typically takes at least 30 min or more, depending upon the conversion sought, it seemed unlikely that the polymerization reaction could be carried out controllably in a continuous (co)polymerization reactor (hereafter "polyreactor") with sufficient speed to be economically attractive. This expectation derives from the well known fact that a decreased overall reaction rate is inherent in a continuous-reactor system ("The Design of Commercial Continuous-Reactor Systems" by A. P. Weber, *Chem. Eng. Progress,* 1953, 49, No. 1).

Reverting to a continuous ROMP process to consider essential details for mass-production of (co)polymer, it is not practical to separate unreacted monomer(s). It is therefore critical that essentially all the (co)monomer(s) are converted to polymer. In our novel process speedy conversion (residence time <30 min) with at least 95% and preferably 99+% conversion is necessary to provide an optical polymer with desirable properties. We can produce speedy and essentially complete conversion in a stirred, single-stage, polyreactor comprising multiple zones in which polymerization is continuous, and in which essentially all (co)monomers are converted in a narrowly defined temperature range using a homogeneous polymerization catalyst.

The polyreactor is referred to as being a "single-stage" reactor because the polymerization heretofore occurred continuously in a batch reactor. There is no question that any polymerization is a single stage reaction in a batch reaction. ROMP remains a single stage reaction because the continuous polyreactor functions as a batch reactor which arbitrarily divides the single stage into plural zones (hence "multi-zoned"). Baffles in the polyreactor serve to divide the reaction space into zones which together, unexpectedly happen to produce speedy and essentially complete conversion only if substantial back-mixing, less than 20%, from one zone with another contiguous zone, is prevented.

In a batch polymerization, such conversion is achieved with longer residence time, and by using a higher concentration of catalyst than one would typically use, had a lower conversion been acceptable. Higher levels of catalyst lead to enhanced risk of temperature fluctuations, and higher cost of production. The longer the residence time, the more the crosslinking through reactions along the unsaturated polymer backbone (gelation).

Further, the economics of a batch reactor for a ROMP process in which reaction time is 30 min or more, are unattractive, and the time required to carry out the hydrogenation and remaining steps, each batchwise, makes the overall process even less attractive. In contrast, the residence time in a continuous ROMP polymerization process is not only less than 30 min, usually less than 5 min, but also it unexpectedly provides essentially complete conversion of (co)monomers with less catalyst than is used in an analogous batch reaction with similar quantities of reactants; moreover, it does so essentially without deleterious gel formation, yet produces (co)polymer which has a mol wt $M_w > 50,000$ with a polydispersity $M_w/M_n < 5$. Thus, in the continuous process we obtain higher conversions than in a batch reaction, but with less catalyst, based on mols of monomer(s)/mol of catalyst.

In the prior art, there is no teaching that there is a correlation of reaction temperature and mol wt of the (co)polymer formed in a ROMP reaction; nor is there a teaching of any relationship of residence time and $M_w/M_n$ of the (co)polymer formed. In an optical substrate, both are critical. Since $M_w/M_n$ is known to be critical to control birefringence (see U.S. Pat. No. 5,034,482) it is not inadvertent that any teaching of this relationship or its significance, was lacking in the art.

Still further, though the processing costs for a continuous process are integrally related to its practical operation, and removal of catalyst, and the amount of solvent used, are each a large portion of such costs, no reference refers to the effects of over-diluting (with solvent) the reaction mass on (a) the mol wt range of the (co)polymer; (b) the hydrogenated (co)polymer (removing the large excess of solvent); or, (c) residence time and % conversion. Yet all three, namely, mol wt, residence time, and % conversion, and most particularly the $M_w/M_n$, must be critically controlled in a continuous ROMP process. Further, though over-dilution may facilitate filtration, over-dilution complicates devolatilization and recovery of recyclable values, namely hydrogenation catalyst, solvent and filter aid.

It is known that the $M_w/M_n$ must be narrow, preferably <5, more preferably <4, and most preferably <3. The ROMP reaction is highly exothermic, and to obtain 95% conversion in a batch reactor, typically takes from 30 min to 1 hr, under the most well-controlled conditions. But the relatively long residence time leads to a $M_w/M_n > 5$. A narrow $M_w/M_n$, for example, that reported in the illustrative examples of the Tenhey et al '041 (col 11, second table) and Goto et al '471 (Table 4) patents, can only be obtained in a small-scale laboratory batch reactor where the reaction of very small amounts of comonomers can be controlled by trial and error, adjusting numerous variables.

In a truly continuous ROMP process in which the first step is polymerization, and there is no separation of the ROMP catalyst (first catalyst) before hydrogenation of the polymer from the reactor, the ROMP catalyst must not adversely affect the efficacy of the hydrogenation catalyst (second catalyst) in the second (hydrogenation) step. Therefore, from among all conventional catalysts known to provide ROMP polymers, and those known to hydrogenate such polymers, it is critical that the 'right' polymerization catalyst be chosen for a continuous polymerization, and that the 'right' hydrogenation catalyst be chosen for combination with the polymerization catalyst.

The reason the first and second steps can be run effectively without intermediate separation of any component in the reaction mass, is because so little first catalyst is used in the first step that the residual first catalyst does not adversely affect the second catalyst. In view of the long residence time required to produce >95% in a typical batch reaction in which the amount of catalyst used is five-fold relative to the amount used in this continuous process, it is indeed surprising that so little first catalyst produces such high conversion with such short residence time.

We find it possible to run this ROMP reaction with less than 20 min residence time, in a single pass, because it is run in a single polymerization zone comprising a single-stage, multi-zoned reactor in which the temperature in the lowest or first reaction zone may be in the range from 0° C. to ambient (20° C.), but the uppermost or last reaction zone is at least 75° C., preferably above 120° C. but lower than 150° C., the temperature in the last zone being generated by the exotherm of the polymerization (first) catalyst which is exceptionally effective (referred to as a "hot" catalyst). However, as pointed out, the higher the speed of the polymerization reaction, the less the control of the reaction, resulting in a higher formation of gel, and if more than 5 parts by wt, based on 100 parts of (co)polymer, is produced, the gel blinds filtration presses, so that it cannot be removed economically. Further, the effectiveness of the polymerization catalyst is vitiated near 150° C. All reference to "parts" of a material refer to "parts by weight" unless stated otherwise. The reason for the success of the continuous reaction in a multi-zoned reactor having at least two, preferably three zones, is that there is essentially no back-mixing between successive zones, and at least the third zone operates at a temperature at least 50° C. higher than that in the first.

The (co)polymer for an optical substrate must be transparent and essentially water-white. It was not appreciated that only a very few particles of gel as small as 0.4 µm, in an amount no more than 0.5 part/100 parts of (co)polymer, would effectively negate the (co)polymer's acceptability. To provide an acceptable (co)polymer, it must be filtered through a 0.4 µm filter. Filtration is impractical if the (co)polymer is too viscous. To provide desirably lower viscosity by diluting with more solvent than can be tolerated, results in having to remove a too-large quantity of solvent, and as earlier indicated, the removal step deleteriously affects the (co)polymer's optical properties.

Finally, in a commercial process using commercially available comonomers such as DCPD, trimer of cyclopentadiene "trimer" or CPDT for brevity), and TD, it is not practical to separate and use asymmetrical trimer (structure I below), but remove symmetrical trimer (structure II below). The cost of monomers free of all trimer to ensure the monomers are free of symmetrical trimer is much higher than monomers containing a very small amount, from 0 to 1% by wt, of (II). This is because separating (II) from any monomer, or mixture of monomers, containing (I) is not practical, and to be commercially viable, a continuous process must (co)- polymerize the (II) present, without causing excessive gel (crosslinking).

Asymmetrical (I)

Symmetrical (II)

It will be evident that the symmetrical trimer (II) has two equally reactive double bonds and is an excellent crosslinking monomer. When >1% by wt of (II), based on 100 parts (I+II), is (co)polymerized in this ROMP process, both double bonds are opened and (II) becomes an effective crosslinker. The resulting gel is mainly removed in the first and second stage plate-and-frame filters. If it is not removed, the polishing filters will be blinded quickly.

The successful copolymerization of no more than 1% by wt of (II) without undue gel formation requires a multi-zoned single-stage polyreactor.

In general, for the condition of continuous feed and continuous discharge, there does not exist any means whereby a uniform retention time for the feed is assured in each of plural zones at different temperatures within the reaction vessel. Since the degree of completion of reaction does vary as a function of both the time spent in the polymerization zone and temperatures within it, it seemed unlikely that a single-stage multi-zoned polymerization zone would help solve the problem. Yet it did.

The novel process of this invention provides a continuous process which could not have been practiced by studying either an analogous batch process, or any relevant continuous polymerization process in the prior art.

SUMMARY OF THE INVENTION

A continuous process for the solution polymerization of appropriate polycycloolefins in a ROMP zone to obtain a processable ROMP homo- or copolymer in solution, and subsequent hydrogenation of the ROMP (co)polymer without removing the residual ROMP catalyst and co-catalyst, provides an optical product having a mol wt $M_w$ in the range from 50,000–300,000 and polydispersity $M_w/M_n$ in the range from 1.3–5.0, more preferably from 1.3–3, the lower the polydispersity the more desirable the physical properties of the (co)polymer. Such an optical product is found to require a homogeneous polymerization catalyst and co-catalyst. Each may be added in each zone, but the total amount of ROMP catalyst used is so small, that the spent catalyst and co-catalyst are not removed from the unsaturated (co)polymer formed, prior to hydrogenation. The amount of soluble catalyst used is in the range from 1 mol of metal catalyst with from 1- to 10 mols of co-catalyst to make at least 1000 mols, and up to 30,000 mols of (co)polymer. The presence of the small amount of spent catalyst and co-catalyst does not have a deleterious effect on the hydrogenation reaction. The hydrogenated (co)polymer product meets the demands of injection molding machines or other thermoforming means used to form a substrate and has a melt flow index in the range from 40–65 gm in 10 min for 1200 gm at 300° C. under a load of 1.2 Kg.

It has been discovered that, to form a thermally processable polymer, no cycloolefin monomer having more than four fused rings can be used. Further, homopolymers are limited to those of TD, 5-ethylidenyl-2-TD, and 9-($C_1$–$C_3$)alkylTD, particularly 9-methylTD and 9-ethylTD. Appropriate monomers to form copolymers continuously in the preferred process specifically referred to herebelow, in addition to those just named, are DCPD, CPDT, NB, 5-methyl-2-NB, 5-ethyl-2-NB, and 5-phenyl-2-NB. Additional NB-type comonomers including methyltetracyclododecene (MTD), ethylidene-TD, and ethylidene norbornene (ENB), all exhibit a distinguishing characteristic when copolymerized within a residence time less than 30 min, they liberate heat in an appropriate range to maintain an effluent from the polyreactor at a temperature within a specified narrow range, yet maintain desirable viscosity without a large proportion of solvent relative to the polymer formed.

Still further, in the most preferred process, the most preferred optical ROMP hydrogenated (co)polymers are those which have a $T_g > 120°$ C. which is most easily attained with the homopolymers named above derived from TD, MTD and substituted derivatives thereof, rising to above 130° C. when the copolymer contains a major amount, and most preferably >70% by weight of TD, MTD or other tri- or tetracyclic cycloolefin comonomers, taken singly or more than one at a time, along with a minor proportion by wt of trimer (CPDT) and less than 1% by wt of symmetrical trimer (based on the wt of all monomers present), so long as the (co)polymer formed is processable.

The first step of the continuous ROMP reaction is carried out in a polymerization zone comprising a multi-zoned, single-stage, continuously agitated reactor referred to as a "ROMP reactor", operated to provide at least two zones, a first and a second, the second in restricted, one-way pressure (fluid) communication with the first, each containing an effective amount of polymerization catalyst and co-catalyst, sufficient for the purpose to which the reactor is dedicated, the catalyst selected from the group consisting of an organoammoniummolybdate, $Mo(Cl)_5$, $W(Cl)_6$, $WO(Cl)_4$, $WO(OR)_{4-x}Cl_x$ where R represents alkyl, phenyl, phenyl substituted phenyl, phenylalkyl, and halogen substituted derivatives of alkyl, phenyl, and phenyl substituted phenyl and phenylallcyl; and x is an integer in the range from 0 to 4; and, in combination with an organoaluminum halide represented by $R'_yAlCl_{3-y}$, wherein R' represents $C_2$–$C_6$ alkyl; y is an integer in the range from 0 to 3, or an alkyltin hydride represented by $R''_3SnH$ where R'' is $C_2$–$C_6$ alkyl; to provide an unsaturated (co)polymer. Where several contiguous reaction zones are provided, each zone is in restricted one-way communication with a contiguous other zone.

Despite the speed at which the polymerization proceeds, the residence time which may be as little as 1 min and as much as 30 min, allows control of residence time and temperature which together sets the reactor's operating pressure in the range from about atmospheric (1 bar) to about 6 bar (90 psig), preferably from about 170 kPa (10 psig) to 450 kPa (50 psig) there being no economical advantage to operating at higher pressure. By controlling the chain transfer agent, precise control of total solids in the reaction mass and its viscosity, is effected. Control of reaction conditions allows control of the amount gel formed in a narrowly defined range from 0.1% to no more than 5% by wt of all (co)monomers fed. At least 95%, preferably >97%, and more preferably essentially 100% of the polycyclic olefin(s) are converted to (co)polymer so that recycle of unreacted monomers is obviated. The residence time in the polyreactor is preferably less than 20 min, and most preferably less than 10 min. The short residence time in turn, provides control of the polydispersity $M_w/M_n$ which must be low, that is, below 5, preferably <4, and most preferably in the range from 2 to 3, if the (co)polymer is to qualify as an optical grade (co)polymer. The relatively small amount of ROMP catalyst used, preferably no more than 1 mol catalyst/1500 mols of polymer made, and most preferably as little as 1 mol catalyst/10,000 mols polymer, allows hydrogenation with a nickel catalyst without removal of the ROMP catalyst.

In the second step of the continuous process, a solution of the unsaturated (co)polymer, is hydrogenated in the presence of a nickel catalyst without removing spent polymerization catalyst, in a hydrogenation reaction having at least two successive stages to yield a solution of hydrogenated (co)polymer essentially free (<5% by wt, based on all polymer) of isomerized polymer. Even if a supported nickel catalyst is used, which one would reasonably expect to be coated by reduced Mo or Ti migrating to the surface of the nickel, the activity of the nickel catalyst is not negated. For reasons stated above, soluble organo-nickel catalysts are most preferred. Such catalysts may be prepared by combining a Ni carboxylate or alkoxide with an alkyl or hydride source as described in U.S. Pat. No. 3,591,064 inter alia, the disclosure of which is incorporated by reference thereto as if fully set forth herein. Typical are $Ni(naphthylate)_2$, $Ni(AcAc)_2$, and others known to be effective, specifically $Ni(O_2C_8H_{15})_2$. In subsequent, successive steps, dissolved spent nickel catalyst is removed conventionally, for example, by treating the polymer solution with carboxylic or mineral acid or acid sopas; or washing with ammonium phosphates and separating the resulting water-soluble Ni salts and Al salts. Other methods include chelating agents such as a dicarboxylic acid, alkali metal silicates or dimethylglyoxime (DMG), and multiple filtrations to remove insoluble residues from the solution of hydrogenated (co)polymer or cement. Thereafter, optical grade copolymer is recovered by devolatilization of the cement.

It has further been discovered that a continuous process to make optical grade copolymer is unique in that the hydrogenation pressure for the first of the stages referred to above, sets the ROMP reactor pressure. The reactor process conditions, in turn, allow the last polymerization zone to be operated to provide an effluent of polymer cement at a temperature in the range from 120° C.–140° C., which is high enough to provide a melt-processable, surprisingly high mol wt (co)polymer having $M_w$ in the range from 50,000–500,000.

It has also been discovered that the hydrogenated melt-processable copolymer produced by ring-opening metathesis polymerization in the polyreactor cannot be centrifuged to make the desired separation. Filtration is required in a multiple-step filtration process in which a plate-and-frame filter press is used for the primary and secondary filtration stages. Up to 95% by wt of the gel in the hydrogenated polymer solution, the polymerization and hydrogenation catalysts and filter aid are removed in the primary filter press to produce a primary flitrate; in the secondary filter press a secondary tiltrate is produced containing only submicron size particles. Optionally, third and fourth filtration stages may be used, the flitrate from a preceding stage being continuously introduced to the succeeding stage. A third stage using a cartridge filter with a submicron porous filter medium is found to provide excellent optical grade copolymer which meets "particle count" specifications. Because of the processing expense related to the peculiar properties of the solids in the feedstream from the hydrogenation zone require the foregoing combination of filtration steps in any practical scheme to provide the optical grade polymer solution.

It has still further been discovered that it is essential that a solution of a polished, optical grade copolymer of the aforesaid comonomers, be devolatilized in a multistep process to avoid excessive loss of copolymer and provide a cement in a viscosity range adapted for a particular extruder used to extrude strands of copolymer which are then cooled and pelletized.

It is therefore a general object of this invention to provide a continuous ROMP process comprising, maintaining a single-stage polymerization in multiple zones including at least a first and a last reaction zone, wherein the first zone is maintained at a temperature in the range from 70° C–100° C. by mixing a reaction medium consisting essentially of at least one of the aforesaid cycloolefin monomers, a $C_3$–$C_7$-α-olefin chain transfer agent, and a diluent amount of $C_4$–$C_8$-cycloalkane with an organoammonium molybdate, metal halide or metal oxyhalide catalyst in combination with an organoaluminum (or organolin) halide co-catalyst present in an amount in which 1 mol of ROMP catalyst forms from 1500 mols to 30,000 mols, preferably from 2000 to 10,000 mols of polymer; maintaining the first reaction zone substantially free from back-mixing with copolymer from a succeeding reaction zone maintained at a temperature at least 20° C. higher than that in the first reaction zone; maintaining the last reaction zone at a temperature in the range from 120° C.–140° C.; continuously controlling the temperature in the last reaction zone by varying only the rate of addition of a combination of catalyst and $C_3$–$C_7$ alkene chain transfer agent; and, continuously crosslinking a major molar proportion of all symmetrical trimer present to produce from 0.1% to 2% by weight of gel/100 parts of copolymer; whereby a copolymer having a mol wt $M_w>35,000$, preferably in the range from 50,000 to 200,000, with $M_w/M_n<5$ and a $T_g$ in the range from 135° C.–200° C. is produced in less than 10 min residence time through the reactor.

The copolymer produced by the foregoing continuous ROMP reaction may be directly hydrogenated in a hydrogenation zone having at least two stages, without separating any component from the copolymerized reaction mass, provided that the hydrogenation is a nickel-based hydrogenation catalyst, because the chlorine content of the polymerized reaction mass, generated by the ROMP catalyst present in an amount in the range from 3 to 8 parts by weight per 100 parts of comonomers is insufficient to affect the efficiency of the nickel-based catalyst, deleteriously.

It is therefore another general object of this invention to provide a two-step process for the hydrogenation of an unsaturated feedstream consisting essentially of (co)- polymer of the aforesaid comonomers, a diluent amount of $C_4$-$C_8$-cycloalkane, unreacted $C_3$-$C_7$-$\alpha$-olefin, and essentially free of unreacted (co)monomer(s), comprising, continuously introducing the unsaturated feedstream into a first hydrogenation zone at a pressure in the range from 1380 kPa (200 psig)–5000 kPa (700 psig), and a temperature in the range from about 23° C.–100° C. in the presence of spent polymerization catalyst for producing the homopolymer, the polymerization catalyst present in an amount in the range from 0.5 part to 6.5 parts by wt/100 parts of (co)polymer, a filter aid, and an effective amount of a supported nickel-containing hydrogenation catalyst in an amount sufficient to produce a partially hydrogenated feedstream under conditions insufficient to isomerize more than 0.5 part by wt per 100 parts of the homopolymer; and, in a second step, introducing the partially hydrogenated feedstream into a second hydrogenation zone at a pressure in the range from 1380 kPa (200 psig)–5000 kPa (700 psig), and a temperature in the range from about 75° C.–150° C., without removing polymerization catalyst introduced into the first hydrogenation zone, and mixing the partially hydrogenated feedstream with additional supported nickel-containing hydrogenation catalyst in an amount sufficient to produce a slurry of an essentially fully hydrogenated feedstream, but insufficient to isomerize >0.5 part by wt of the homopolymer; converting >97% of double bonds in the unsaturated feedstream to single bonds; and, converting <97 parts by wt of the homopolymer to isomers thereof, without deleteriously affecting the hydrogenation catalyst.

It is a specific object of this invention to provide a process for hydrogenating the copolymer obtained in a multi-zoned single-stage polymerization zone, comprising, (a) continuously introducing the reaction mass directly from the polymerization zone into a first hydrogenation zone at a pressure in the range from 3550 kPa (500 psig)–5000 kPa (700 psig), and a temperature in the range from about 70° C.–90° C. in the presence of spent polymerization catalyst present in an amount in the range from 0.5 part to 6.5 parts by wt/100 parts of polymer, a filter aid, and an effective amount of a supported nickel-containing hydrogenation catalyst in an amount sufficient to produce a partially hydrogenated feedstream, and insufficient to isomerize 0.5 part by wt of the copolymer; and, in a second step, (b) introducing the partially hydrogenated feedstream into a second hydrogenation zone at a pressure in the range from 3550 kPa (500 psig)—5000 kPa (700 psig), and a temperature in the range from about 110° C.–150° C., without removing the polymerization catalyst introduced into the first hydrogenation zone, and mixing the partially hydrogenated reaction mass with additional supported nickel-containing hydrogenation catalyst in an amount sufficient to produce a slurry of an essentially fully hydrogenated feedstream, but insufficient to isomerize >0.5 part by wt of the unsaturated polymer; whereby more than 97% of double bonds in the unsaturated reaction mass are converted to single bonds without deleteriously affecting the hydrogenation catalyst which is recovered for reuse.

In this process for producing an optical grade homopolymer of particular tricyclic and/or tetracyclic (co)monomers it is essential that a multiple-step filtration be used in the filtration and polishing zones. The process comprises, (a) continuously flowing a slurry of hydrogenated homopolymer containing gel, nickel-containing catalyst and spent polymerization catalyst, but essentially free of dissolved hydrogen, into a primary filtration zone comprising at least one filtration means, preferably a plate and frame filter press having primary screening means to filter out particles greater than 20–30 $\mu$m in nominal diameter, at a pressure in the range from 3550 kPa (500 psig)–5000 kPa (700 psig), and a temperature in the range from about 70° C.–150° C.; (b) recovering from the primary filtration zone, a filter cake of solid particles larger than openings in the primary screening means and producing a primary flitrate containing solids smaller than the openings in the primary screening means, and essentially free of solid particles larger than the openings; (c) filtering the primary flitrate at a pressure in the range from 3500 kPa–4900 kPa and a temperature in the range from about 70° C.–150° C. in a secondary filtration zone containing secondary plate-and-frame filter means having secondary screening means with secondary openings having a nominal diameter of 1 $\mu$m; (d) recovering solid particles larger than 1 $\mu$m and producing an essentially gel-free semi-polished secondary flitrate containing solids smaller than 1 $\mu$m and essentially free of solid particles larger than said primary openings; (e) filtering the semi-polished flitrate through a cartridge filter means having a porous filter medium with pores no larger than in the range from 0.4–0.5 $\mu$m; and, (f) recovering solid particles larger than said pores and producing a polished flitrate;

whereby more than 99% by weight of spent polymerization catalyst, used hydrogenation catalyst and filter aid, present in said essentially saturated polymer is removed to produce a solution of saturated polymer which meets particle count specifications for optical grade polymer.

Particular high $T_g$ thermoplastic polymers having a $T_g$ in the range 100°–200° C., preferably 120°–180° C., are produced by the hydrogenation of the ROMP reaction product of from 40–60 parts of TD the remaining copolymer(s) selected from the group consisting of DCPD, and the alkyl- and alkylidene-substituted derivatives of DCPD, wherein the TD contains at least 15% of the exo- component. The polymers produced by this process have desirable combinations of thermal, optical, electrical, mechanical, and barrier properties which make them suitable for use in a variety of manufactured articles including optical recording media, optical fibers and lenses, printed electronic circuit boards, and packaging materials and blends with other polymers.

BRIEF DESCRIPTION OF THE DRAWING

The figure is a flowsheet of the process in which the steps of the process are schematically illustrated.

DETAILED DESCRIPTION OF THE INVENTION

The preferred (co)monomers are those commercially derived by a Die's Alder reaction with cyclopentadiene (CPD), the reaction being specifically controlled to produce (i) DCPD and (ii) "trimer" (CPDT) in which it is essential that the amount of symmetrical trimer (II) be limited to 1%.

Higher homologues of CPD than TD, such as pentamer and the like, are unacceptable comonomers for the purpose at hand, and are desirably separated from the monomers to be used. When carrying out the oligomerization of CPD to limit the formation of tetramet and higher mol wt oligomers, it is found that the amount of trimer formed is no more than about 20% by weight, less than 1% of which is symmetrical. In the most preferred embodiment of this invention, the entire reaction mass from the Die's Alder oligomerization preferably containing a major proportion by weight of DCPD, is used to make up the feed in this novel process.

The process of this invention comprises the ring-opening polymerization of cyclic olefins that are characterized by the presence of at least one norbornene moiety having the general structures shown below:

These cyclic olefins may be either substituted or unsubstituted and can exist either in the endo- or exo- form, but are generally present as a mixture of both forms. When polymerized in a ROMP reaction, the polymer formed may have either cis- or trans- unsaturation in the backbone. Suitable cyclic olefins include substituted and unsubstituted norbornenes, dicyclopentadienes, dihydrodicyclopentadienes, trimer of cyclopentadiene, tetracyclododecenes, ethylidene-TDs, hexacycloheptadecenes, ethylidenyl norbornenes and vinyl norbornenes.

Substituents on the cyclic olefins include hydrogen, alkyl, alkenyl, halide, amide, and aryl groups containing 1 to 20 carbon atoms and saturated and unsaturated cyclic groups containing 3 to 12 carbon atoms which can be formed in combination with at least one, and preferably two ring carbon atoms. In general, the substituents on the cyclic olefins may be any which do not unduly depress the $T_g$ of the polymer, or poison or deactivate the ROMP catalyst. Examples of preferred monomers include DCPD, TD, MTD, 2-norbornene, $C_1$-$C_{20}$-alkyl-2-norbornene, particularly 5-methyl-2-norbornene, 5-ethyl-2-norbornene, 5-ethylidenyl-2-norbornene (or 5-ethylidene-norbornene), 5-cyclohexyl-2-norbornene, 5-isopropenyl-norbornene, 5-vinyl-norbornene, tricyclopentadiene (or cyclopentadiene trimer, CPDT), dihydrodicyclopentadiene (or cyclopentene-cyclopentadiene co-dimer), methyl-NB, ethyl-NB, 9-ethyl-tetracyclo[6,2,1,1$^{3,6}$,0$^{2,7}$]dodecene-4 (or ethyl-tetracyclododecene), and the like.

Copolymers of two cyclic olefin monomers, one of which is DCPD are especially preferred. For example, a copolymer of DCPD and MTD and, a copolymer of MTD and MNB are especially suitable. Terpolymers are also made, preferably those in which at least one monomer is TD or a $C_1$-$C_{12}$-alkyl-substituted TD. These homo-, co- and terpolymers are of particular interest because they exhibit a saturated water absorption of 1.8% or less, and a glass transition temperature above 100° C., preferably as high as about 220° C.

Since the polymers are obtained by solution polymerization, it is essential that the polymerization solvent be inert relative to the hydrogenation catalyst and also to any solvent, if different from the polymerization solvent, added prior to hydrogenation, referred to as the "hydrogenation solvent". Suitable polymerization solvents include aliphatic and cycloaliphatic hydrocarbons containing 4 to 10 carbon atoms (e.g., cyclohexane, cyclooctane, and the like). It is most preferred to use the same solvent in polymerization and hydrogenation, and the most preferred solvent is cyclohexane.

Figure 1A:
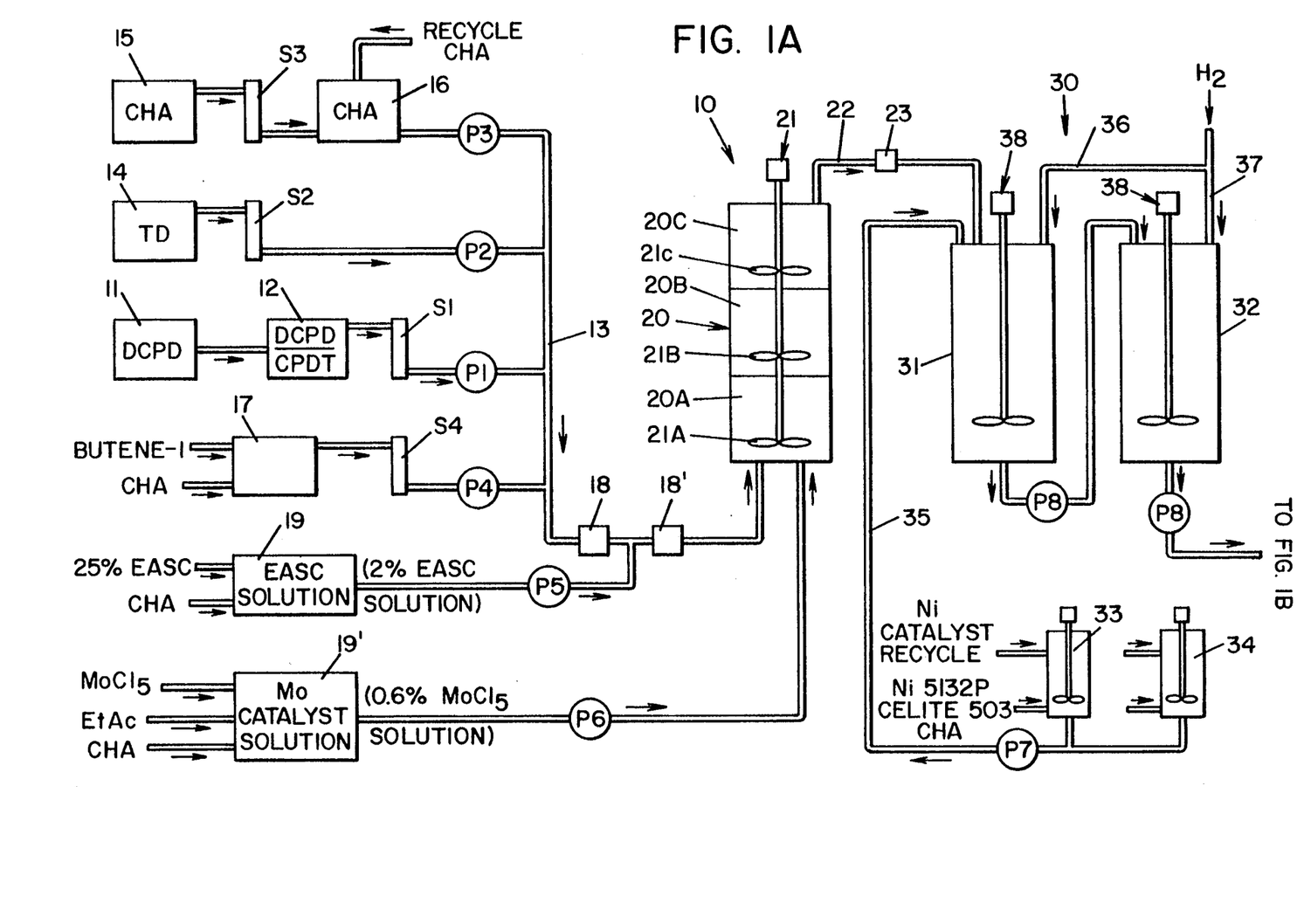
Figure 1B:
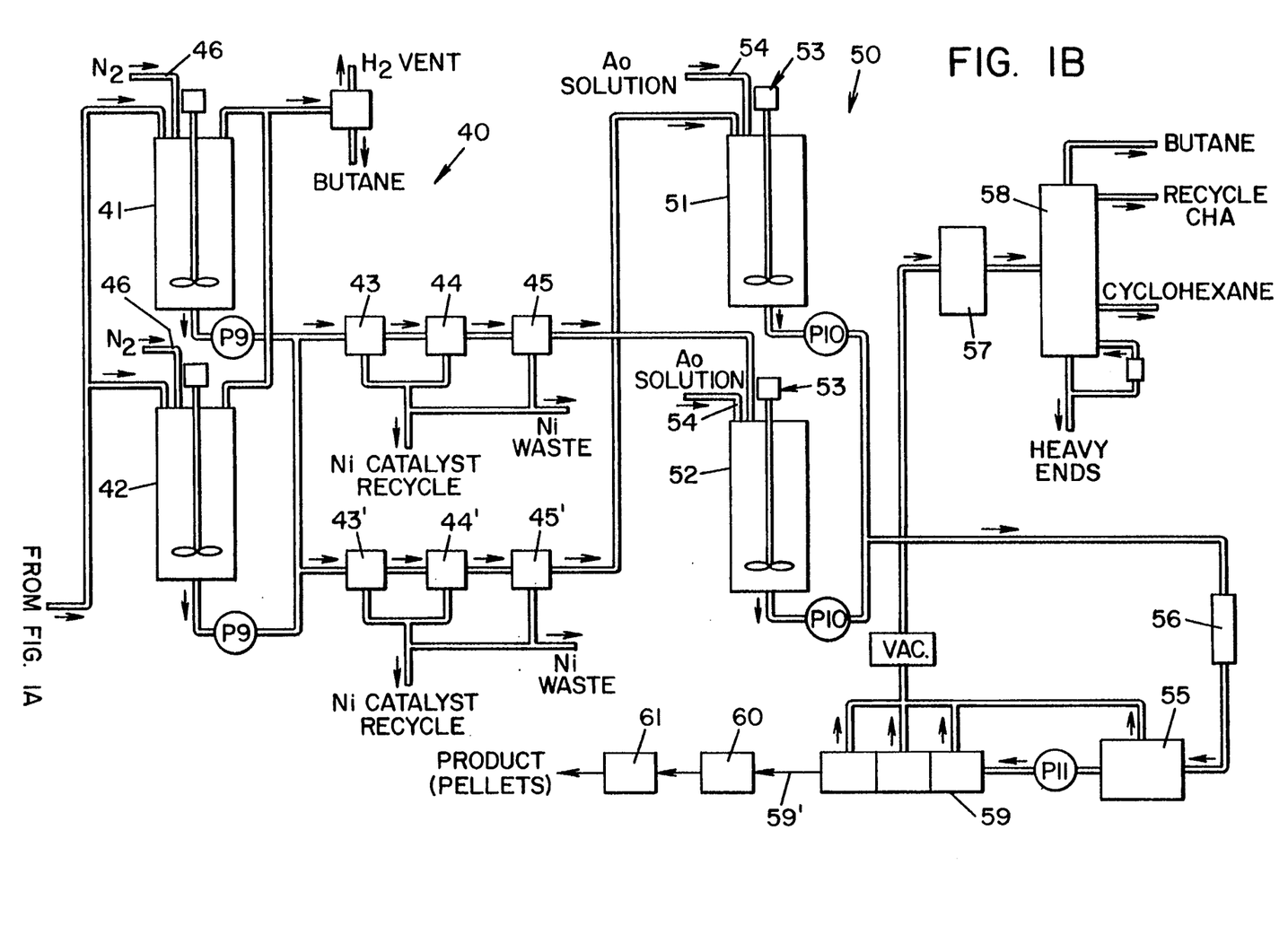

Referring to the flowsheet, a continuous manufacturing facility comprises four main processing sections, namely (a) the polymerization section identified generally by reference numeral 10, (b) the hydrogenation section identified generally by reference numeral 30, (c) the filtration section identified generally by reference numeral 40, and (d) the devolatilization and pelletizing section identified generally by reference numeral 60. For the purpose of illustration, the best mode of carrying out the process is described to manufacture a terpolymer of DCPD, TD and CPDT (cyclopentadiene trimer, derived from DCPD on site) present in the ratio of 53/41/6 respectively, which is the most preferred copolymer because it has been found that only very little trimer is surprisingly effective to raise the $T_g$ of a DCPD/TD or DCPD/MTD copolymer, without crosslinking so much of the polymer that it is impractical to separate the gel by commercial unit operations such as centrifuging and filtration. All per cent numbers herein refer to "per cent by weight" unless otherwise stated.

The polymerization section:

Referring to the polymerization section 10, DCPD is fed from a tank 11 to a heat-soaking pot 12 where it is cooked to yield about 15% by wt trimer. The reaction product from pot 12 is flowed through a sieve column S1 of moisture-removing molecular sieves, in fluid communication with a metering pump P1 which discharges a mixture of sieved monomers, mainly DCPD and CPDT with traces of other multi-ringed cycloolefins, into a manifold 13. TD is withdrawn from storage tank 14 through another sieve column S2 and flow-controlled by pump P2 into the manifold 13. Cyclohexane (CHA) in which the solution polymerization is carried out, is drawn from storage tank 15, through a third sieve column S3 into a recycle surge tank 16 and metered into the manifold 13 by metering pump P3. Butene-1 is diluted with cyclohexane 50/50 in a butene tank 17, then pumped through a fourth sieve column S4 and metered with metering pump P4 into manifold 13.

Catalyst is added as a solution in cyclohexane and ethyl acetate from catalyst mixing tank 19' from which is withdrawn the amount of MoCl$_5$ to be added, calculated on the basis of 3000–3500 moles of monomers per mole of MoCl$_5$. Also added is an amount of EASC calculated on the basis of 2.5–3 mols EASC per mol of MoCl$_5$. A representative MoCl$_5$ solution contains 0.6 parts MoCl$_5$, 87.8 parts cyclohexane, and 11.6 parts ethyl acetate. A representative EASC solution consisted of 0.5 parts EASC, 98 parts cyclohexane, and 1.5 parts toluene.

Predetermined amounts of each of the aforesaid components in the manifold are mixed in a first static mixer 18, after which is injected a 2% solution of co-catalyst EASC in cyclohexane diluted in co-catalyst tank 19, and metered into the discharge from the first static mixer 18'. To ensure that the co-catalyst is thoroughly mixed into the feedstream, a second static mixer 18' is provided. The discharge from the second static mixer 18' is led into the bottom of a single-stage reactor indicated generally by reference numeral 20.

More specifically, the feed is led into a first zone 20A of the reactor 20 which has contiguous second and third zones 20B and 20C separated from each other, 20B from 20A and 20C from 20B, by intermediate zone-defining floors, with zone 20B being directly above zone 20A and having its (20B's) lower portion in open flow communication with zone 20A; and zone 20C being directly above zone 20B and having its (20C's) lower portion in open flow communication with zone 20A. The zones 20A and 20B are essentially completely filled with reaction mass, the contents of zone 20A up-welling into zone 20B through a port. Also injected into the first zone 20A is a metered amount of molybdenum pentachloride catalyst withdrawn from catalyst tank 19' as a 0.6% MoCl$_5$ solution in ethyl acetate and cyclohexane which initiates copolymerization autogenously, soon as it contacts the feed containing co-catalyst.

Since the comonomers DCPD, TD and CPDT are fed from storage tanks in the desired mol proportion to provide a terpolymer in the weight ratio DCPD:TD:CPDT=53/41/6, and the amount of butene-1 to be introduced to afford the desired molecular weight at a given temperature is determined by trial and error, it is only necessary to control the temperature of the reaction in each zone of the reactor, the temperature of the last zone being maintained substantially constant, so that the reactor appears to operate isothermally though it is insulated to minimize heat transfer to the surroundings. If a homopolymer is to be made, e.g. homoMTD which is most preferred, the rate of addition of monomer and butene-1 are controlled to provide the desired mol wt and the appropriate temperature in each zone of the reactor. Typically no more than 2% butene-1 is added, based on the total weight of comonomers or monomer in the feed entering the zone 20A, the more butene-1 added, the lower the molecular weight. It is critical that the alkene be present in the range from 0.1 mol to about 1.0 mol per mol of monomer, preferably 0.1–0.8 mol alkene per mol monomer, or the polymer solution formed has an undesirably high viscosity and forms a gel plugging the polyreactor.

Butene-1 is the most preferred chain transfer agent to control molecular weight of the polymer but pentene-1, hexene-1 and heptene-1 are comparably effective, the choice of one over the other depending upon the ease with which the hydrogenated chain transfer agent can be separated from the solvents used in the process, and other economic factors. Other olefins are found to be undesirable for large scale operation.

The reactor 20, which may be jacketed to provide individual jackets for each zone better to control heating or cooling, is provided with a multi-turbine mixer 21 having vertically spaced apart turbines 21A, 21B and 21C fixedly disposed on a common central vertical shaft. The separate turbines not only provide highly effective continuous mixing, but each is positioned near the bottom of each zone 20A-C so as to provide a pseudo-pumping action which sweeps entering reaction mass up-flowing through the floor below the turbine, from the zone below, and denies the entering reaction mass re-entry into the zone from which the reaction mass welled upwards. A reactor with three zones is illustrated because for practical reasons additional zones make control of the reaction more difficult, as does the control of a reactor with only two zones.

The essential control of temperature through the reactor commences with maintaining the zone 20A in the range from about 70°–90° C. The second zone 20B is controlled in the range from 85° C.–110° C.; and the third zone 20C is controlled in the range from 100° C.–130° C. The precise temperatures to be maintained in each zone will depend upon the monomer to be homopolymerized, or the comonomers to be copolymerized, the mol wt desired, the dilution of the reaction mass, and other factors. Control of the reaction in each zone is facilitated by injection ports for solvent and 1-butene (not shown). In addition, an injection port is provided for addition of ultraviolet light stabilizers, antioxidants, and the like.

When "lined out" under continuous polymerization conditions, more than 95% and typically 99% of the (co)monomers are converted and a viscous cement of polymer in solution is continuously withdrawn from the zone 20C, through conduit 22 at the top of the reactor. The total residence time of the comonomers in the reactor 20 is about 10 min, and the cement contains about 20% by wt solids. The unsaturated polymer has a narrow dispersivity <5, typically <4, but a much higher $T_g$ than what it will have after it is hydrogenated.

Though the above description relates to a vertical reactor which was used, it is not essential that the successive zones 20A et seq be vertically contiguous. In another embodiment the reaction zones may be side-by-side with walls defining each zone, and a communicating port in the upper portion of each wall. In a horizontal reactor it may be easier to control back-mixing between successive zones particularly since separately driven impellers may be used for each zone, and the speeds of each controlled as dictated by the condition of the polymerizing reaction mass in each zone. However, the vertical reactor was used because it was at hand. Either the vertical or the horizontal multi-zoned reactor provides essentially complete monomer conversion and a narrowly defined residence time for the reactants. The latter leads to a narrow molecular weight distribution for the polymer formed. If additional residence time is required in the final stage, it can be provided by flowing the discharge from the last reactor zone into a large diameter tube of arbitrary length, long enough to ensure that essentially complete conversion of monomers is achieved.

Thus it is seen that the process for continuously polymerizing a feed of particular tricyclic and/or tetracyclic cycloolefin (co)monomers to produce a homo- or copolymer further processable into an optical grade, comprises, (a) introducing a portion of the feed comprising at least 35% by wt of DCPD, at least 5% by wt of trimer including symmetrical trimer, and the remaining monomers if any, selected from the group consisting of TD and substituted TD, in a desired molar ratio, at a first temperature in the range from about 70°–90° C. into a first reaction zone, and the remaining portion of feed, if any, in a successive contiguous reaction zone of a multi-zoned, single-stage continuously agitated polymerization zone containing a $C_4$–$C_8$-cycloalkane, in combination with a sufficient amount of a molybdate/-, molybdenum pentachloride/-or tungsten hexachloride/organoaluminurehalide catalyst system to provide an autogeneously preheated reaction mixture in which at least 95% by wt of comonomers fed are converted to copolymer in less than 20 min residence time total in both first and second reaction zones of the polymerization zone;

(b) adding a $C_4$–$C_7$ alkene chain transfer agent in either first or second reaction zone, in an amount sufficient to initiate reaction of the comonomers in the first zone, and to maintain a desired second temperature, higher than the first temperature, in the second zone;

(c) continuously transferring a portion of the reaction mixture in the first zone to the second zone disposed in restricted, one-way fluid communication with the first zone, in which second zone a second temperature in the range from 90°–130° C. is autogenously maintained while the reaction is modulated with from 0–2% by wt of the chain transfer agent, based on the weight of the comonomers in the first zone; and, (d) withdrawing a copolymer from the polymerization zone, the copolymer having a $M_w/M_n<5$, preferably $<4$, and a $T_g$ in the range from 150° C.–250° C.

The function of the polymerization section 10 is to provide essentially complete conversion and yield a cement of desirable viscosity leaving the reactor 20 through conduit 22. The viscosity is monitored by a viscometer 23 before the cement is led directly to the hydrogenation section 30. If the cement is too viscous, additional cyclohexane is injected into one of the reaction zones, or in each of them; if not viscous enough, the flow of solvent to the reactor may be decreased. It is generally not necessary to deactivate the metathesis catalyst prior to hydrogenating the polymer, but if desired, a a deactivator may be injected into the conduit 22 in an amount sufficient to provide the desired neutralization provided the deactivator has no adverse effect on the heterogeneous nickel hydrogenation catalyst.

The copolymer formed preferably includes at least 35% by wt of DCPD, from 40–60% by wt TD or MTD, and from 0.1%–1% by wt of symmetrical trimer, along with as much asymmetrical trimer, from 10–20% as is associated with the symmetrical trimer when the trimer is made from DCPD. If asymmetrical trimer is available, separated from symmetrical trimer, from 20% to 50% of asymmetrical trimer may be used with the DCPD, the remaining monomers, if any, selected from the group consisting of TD and substituted TD.

The hydrogenation section:

The hydrogenation section, indicated generally by reference numeral 30 comprises duplicate sets of at least two cylinders 31 and 32 (the second set, to allow unsaturated polymer in the cement to be stored while cement withdrawn from the polymerization zone is being hydrogenareal, is not shown). While cement is being flowed into the first cylinder 31, a specified amount of the nickel hydrogenation catalyst made up in catalyst make-up tanks 33 and 34 is introduced through conduit 35 into the first cylinder 31 with metering pump P7.

It is essential that the nickel catalyst be present in a small enough particle size that a particle is able to contact the double bond of a monomer and activate it so that the double bond is susceptible to hydrogenation. Most preferred is a soluble nickel catalyst which is soluble in the cement and functions as a homogeneous catalyst believed to be provided in the desired particle size by the aluminum alkyl present in the cement. If an insoluble nickel catalyst is used, the particle size is so small that it has the attributes of a homogenous catalyst. A specified amount of the nickel catalyst is soluble with a filter aid such as Celite 503 in cyclohexane. Such amount is chosen so that it will not cause undesirable isomerization, no more than 10% of the polymer, when hydrogen is slugged to the cylinder.

The slurry is introduced into the first hydrogenation cylinder 31 of at least a pair of twin hydrogenation cylinders 31 and 32. To ensure that the nickel catalyst and filter aid (if added) are held in suspension and homogeneously distributed throughout the polymer, each cylinder is preferably provided with a turbine mixer 80. Additional cylinders may be used for more precise control of hydrogenation to minimize isomerization, but two are generally sufficient. The cement, at a controlled temperature which is desired for its hydrogenation, is flowed into cylinder 31 until a predetermined level in the tank is reached, when the flow of cement is switched to a second set of hydrogenation cylinders 31' and 32' (not shown) which are essentially identical to the first set 31 and 32.

Immediately after the flow of cement is switched to the duplicate set, H$_2$ is slugged to cylinder 31 through conduit 36 at a very high rate and the cylinder 31 is pressurized. The first stage hydrogenation is carried out in 31 at high pressure, typically 600 psig, and relatively low temperature, about 80° C., to initiate hydrogenation without isomerization. The amount of time for first stage hydrogenation is slightly less than that required to fill the duplicate first cylinder 31' with cement.

As soon as the first stage hydrogenation is completed in 31, the partially hydrogenated cement is flowed under pressure at about 80° C. to cylinder 32. The cylinder 31 is provided with a pump P8 for flexibility, as is the second cylinder 32, so that the cylinders can be interchanged if desired. In the second and final stage of hydrogenation is also carried out at a pressure of about 600 psig when hydrogen is introduced through conduit 37. As hydrogenation proceeds the exotherm increases the temperature to 130° C. where it is maintained until hydrogenation is complete. When complete, hydrogen is vented to a hydrogen recovery section (not shown) until the pressure is returned to atmospheric. More than 99% of the double bonds in the DCPD/TD/CPDT terpolymer are saturated. A sample taken from the second reactor, when filtered and devolatilized to afford the hydrogenated terpolymer is found to have a $T_g$ of 140° C.

Thus it is seen that the process for continuously hydrogenating, in at least two stages, a feed of an unsaturated (co)polymer of tricyclic and/or tetracyclic cyclo-olefin (co)monomers in solution, to produce a homo- or copolymer which is further processable into an optical grade, comprises, (a) hydrogenating a solution of the (co)polymer in a first hydrogenation zone while maintaining solids, if any, in a homogeneous suspension in the (co)polymer while it is being hydrogenated in the presence of a spent polymerization catalyst and finely divided solids comprising from 0.1 to 5 parts by wt of crosslinked globules of (co)polymer, from 0 to 20 parts of a filter aid, and from about 4 to 6 parts by wt of nickel hydrogenation catalyst per 100 parts of (co)polymer to be hydrogenated at a temperature in the range from 20°–90° C. insufficient to isomerize $>10\%$ by wt of the (co)polymer, at a pressure in the range from about 3550 kPa (500 psig) to about 5000 kPa (700 psig) with hydrogen flowed in at a rate sufficiently high to avoid isomerization of $>10\%$ by wt of partially hydrogenated (co)polymer;

(b) flowing the partially hydrogenated (co)polymer to a second hydrogenation zone;

(c) further hydrogenating the partially hydrogenated (co)polymer in a second hydrogenation zone in the presence of the nickel catalyst introduced in the first zone at a pressure in the range from about 3550 kPa (500 psig) to about 5000 kPa (700 psig) and a temperature in the range from 100°–130° C., preferably autogenously reached during hydrogenation in the second zone, preferably in the range from 23°–55° C. (75°–120° F.);

(d) maintaining the solids in a homogeneous suspension in the partially hydrogenated (co)polymer until essentially all double bonds are hydrogenated; and, (e) recovering a suspension of spent polymerization catalyst, hydrogenation catalyst, filter aid and globules of crosslinked polymer in a solution of hydrogenated (co)polymer.

The filtration section:

The filtration section referred to generally by reference numeral 40 is configured to filter the hydrogenated (co)polymer, which is held in a pair of twin holdup tanks 41 and 42, in at least three stages or it is impractical to filter the hydrogenated (co)polymer and produce optical grade polymer. It has been found that, irrespective of which homopolymer or copolymer is made, the continuous process as practiced in this disclosure yields undesirable gel in a wide range of sizes which makes the three stage filtration essential for optical grade polymer. For lower quality polymer it is possible to dispense with the cartridge filters.

Filtration with a Supported Nickel Catalyst:

Each holdup tank 41 and 42 is equipped with a high speed turbine mixer to ensure that the Celite filter aid introduced with the catalyst in the hydrogenation section, does not settle. The tanks are connected to a source of nitrogen through conduit 46 to provide an inert gas blanket. Since the hydrogenation is completed, excess hydrogen, along with some butane, is swept out with the nitrogen. The contents of each tank 41 and 42 are gradually continuously discharged by high pressure pumps P9 to feed twin filtration tmins, each configured sequentially to filter coarse, that is macro or millimeter size and bigger particles in a primary filtration 43 and 43', then finer particles, that is micron-size and larger particles in a secondary filtration 44 and 44', and finally submicron-size particles in a tertiary filtration 45 and 45'. A centrifuge cannot effectively make the primary separation which is practiced in a primary plate-and-frame filter press 43 which removes substantially all (>90%) of the coarser Celite particles and the larger globules of gel. The flitrate from filter press 43 is directly flowed to a secondary plate-and-frame filter press 44 in which essentially all (>190%) of catalyst particles and finer agglomerates of gel are removed; and, then flowed to a tertiary cartridge filter 45 in which essentially all the finest particles of catalyst and gel are removed to meet a desired particle count specification. Solids from each filtration stage are recovered and recycled to the hydrogenation section and periodically purged to a metal recovery system (not shown).

As shown in the flowsheet, hydrogenated cement, including gel, is first filtered through the primary plate-and-frame filter press 43 at about 4200 kPa (600 psi) fitted with primary screening means such as woven screens to remove particles larger than 20 $\mu$m. The primary filtrate essentially free of gel particles larger than 20 $\mu$m, by which is meant that there is less than 0.01% (100 ppm, parts of gel by weight per million parts of (co)polymer formed) of such gel left in the primary flitrate. The 20 $\mu$m-gel-free flitrate is then filtered through the secondary plate-and-frame filter press 44 also operating at about 4200 kPa and fitted with secondary screens such as cloth having 1 $\mu$m openings to produce a secondary flitrate essentially free of gel particles larger than 1 $\mu$m; and finally, the secondary filtrate is "polished" in 0.4 $\mu$m cartridge filters operating at about 700 kPa. The maximum viscosity allowed for the hydrogenated (co)polymer prior to being polished is about 500 cp. At a higher viscosity the pressure required destroys currently available cartridge filters.

The devolatilization and pelletizing section:

The first step in the devolatilization and pelletizing section 50 is "tuned" to thoroughly mix additives, particularly uv-light stabilizers, antioxidants, and the like, in the solution of polymer in the $C_6$–$C_8$ alkane solvent. Such vigorous mixing as is required to mix the additives into the polymer, is found to form particles of crosslinked gel. Since such gel as is formed must be removed by filtration prior to volatilizing the solvent, and it is not possible to remove such gel particles after the solvent is removed, it is necessary to volatilize no more solvent per unit weight of hydrogenareal polymer than which leads to the formation of a negligible number of particles of gel. The amount of solvent volatilized is no more than 10 lb/per lb of polymer in solution and may be as low as 5 lb if the additives get dispersed easily, without excessive agitation.

The filtered terpolymer is flowed into one of a pair of twin devolatilization holdup tanks 51 and 52, each provided with a turbine mixer 53 to mix in such stabilizers as may be necessary, in particular, an AO and a UV stabilizer through conduit 54. A pump P10 pumps the solution of stabilized hydrogenated terpolymer to a guard filter 56 to remove such small but objectionable amounts of gel as may be formed. From the guard filter 56, the stabilized solution free of objectionable solids is led to a jacketed flash evaporator 55 to flash off solvent to condensers (not shown) and condensed solvent flows to a solvent reclamation tank 57 from which it is pumped to a solvent fractionation column 58 in which butane is taken overhead, 'heavies' comprising high-boiling soluble polymers are taken below, and cyclohexane at an intermediate plate.

The polymer, essentially free of solvent, is typically heated about 10° C. above its $T_g$ to keep it flowable so that it can be pumped. A vacuum may be applied to aid volatilization of the organic solvent in the evaporator. Liquid polymer from a flash evaporator 55 is pumped by pump P11 to an extruder 59, preferably a twin screw extruder equipped with either atmospheric or vacuum vents. An extruded ribbon 59' from the extruder 59 is led through a ribbon cooler 60 and then to a pelletizer 61. Product pellets are then packaged for shipment.

The terpolymer produced has excellent optical clarity and the following properties:

$M_w 61.2 \times 10^3$ $M_n = 20.5 \times 10^3$ $M_w/M_n = 2.99$ $T_g = 138°$ C.

The following illustrative examples relate to copolymers made with 1-hexene. The invention is further illustrated by the following examples, which are intended to be representative rather than restrictive of the scope of this invention.

Polymerization conditions and properties of the resulting polymer are summarized in Table I. A sample of product was withdrawn from the third zone of the reactor into a glass jar containing prescribed amounts of shortstop (Fotocol), ethanol amine, and antioxidant (CAO-5). The polymer was precipitated with acetone. The polymer was then dried.

Physical properties of the polymer were determined using the following methods:

Glass Transition Temperature ($T_g$): Differential Scanning Calorimetry (DuPont 990), heating at 10° C./min.
Heat Distortion Temperature (HDT): ASTM D-648 at 264 psi loading
Hardness—Rockwell R: ASTM D-785
Hardness—Shore D: ASTM D-2240
Impact, Izod: ASTM D-256 at room temperature and −40° C.
Tensile and Elongation: ASTM D-638, Type I dumbbell pulled at 0.2 in/min.
Melt Flow: Capillary rheometer (Instron Model A70).
Tube diameter 0.0301 in, length 0.901 in.

Example 1

Continuous Polymerization and Hydrogenation of MTD and MNB (90:10):

A feed consisting of a mixture of 90 parts of MTD and 10 parts MNB, 18.5 parts of hexene-1 and 333 parts of cyclohexane, preheated to 25° C. was fed continuously to the lowest zone of a three-zoned polyreactor. 1.5 parts MoCl$_5$ dissolved in 29.5 parts ethyl acetate and 6 parts of EASC dissolved in 94 parts toluene are injected into the feed line just prior to entering a vertical tri-zoned reactor at its lowest level.

The heat of reaction heats the lowest zone to 23° C. and this temperature was maintained by the rate of addition of the feed and catalyst system. When the lowest zone was filled, the reaction mixture welled up into a second (intermediate) zone immediately above the lowest, and the heat of reaction was effective to maintain the temperature of the intermediate zone at about 32° C. Again, this temperature was maintained by the rate of feed and catalyst system, before the reaction mass from the intermediate zone welled up into the topmost zone. The heat of reaction continued to raise the temperature of the topmost zone to about 40° C., and again, this temperature was maintained. A shortstop, e.g. Fotocol, is added to the unsaturated polymer along with a piperazin-2-one uv-light stabilizer and a tricyanurate antioxidant, to stabilize the polymer.

The reaction mass is discharged from the topmost zone at a temperature of about 40° C. into a 50 gal hydrogenation reactor containing a SiO2/AlO2-supported Ni hydrogenation catalyst (0.65% Ni) and 4.5 lbs of diatomaceous earth. The hydrogenation reactor is immediately pressurized with 300 psig of hydrogen and the pressure maintained while the temperature was 100° C. and then ramped to 135° C. to simulate the continuous hydrogenation.

Since the hydrogenation reaction itself was not continuous, polymer from the bottom most zone of the polyreactor is flowed into a duplicate hydrogenation reactor (not shown).

The hydrogenated cement is filtered, devolatilized and pelletized as described hereinabove.

Example 2

Batch-wise Polymerization and Hydrogenation of MTD and MNB (90:10):

To obtain comparable mol wt polymer, the reactants given in Table 1 were used in this example. The reactants are fed into a conventional stirred tank batch polymerization reactor. As will be evident from the data presented in Table 1. The residence time is 30 minutes, the dispersivity of the polymer formed in the Batch reactor is worse and there is more gel formation.

The polymer cement was hydrogenated using a homogeneous Ni catalyst. The polymer is flowed to a hydrogenation reactor where a solution of nickel ethylhexanoate and triethylaluminum was introduced. The reactor is pressurized with hydrogen to 300 psig starting at room temperature and then ramped to 75° C.

The hydrogenated cement is mixed with 1.25 moles of DMG per equivalent weight of Ni used as catalyst with a minimal amount of water and stirred while air is bubbled through the solution. The color changes from black to deep red. Celite filter aid is added to the solution before it is filtered. It is then treated in the devolatilization section as described hereinabove. The flitrate is water white indicating the polymer has been stripped of its Ni content. The polymer is isolated by precipitating in a mixture of isopropanol and water.

Alternatively, the hydrogenated cement is vigorously mixed with 5% acetic acid in water during which time the color changes from dark black to clear. The solution is allowed to settle and the acetic acid layer is discarded. The polymer solution is repeatedly washed with an equal volume of 5% sodium bicarbonate solution after which the polymer is precipitated in iPrOH/H$_2$O.

Example 3

This example is provided to show that, under appropriate conditions, there may be no substantial difference in results whether a supported or a soluble nickel hydrogenation catalyst is used. The amounts of each monomer component used in the example is shown in Table 1, the amount of chain transfer agent was varied as noted. The conditions of the polymerization reaction were the same as in Example 1

The polymer cement was hydrogenated using a homogeneous Ni catalyst. The polymer is flowed to a hydrogenation reactor where a solution of nickel ethylhexanoate and triethylaluminum was introduced. The reactor is pressurized with hydrogen to 300 psig starting at room temperature and then ramped to 75° C. The reaction mass in the hydrogenation reactor is substantially completely hydrogenated, >97% of all double bonds, and most preferably >99% being hydrogenated.

Examples 4–10

The examples 4–10 in the Table are additional runs made with MoCl$_5$ catalyst and EASC with hexene as the chain transfer agent. In each of the runs, the unsaturated polymer cement was hydrogenareal with nickel ethylhexanoate and triethylaluminum.

TABLE 1

| Example | Mon/1-hexene Mol Ratio | Mn × 10$^{-3}$ | Mw × 10$^{-3}$ | Mw/Mn | Total Unsat. (NMR) | Ni ppm | Ni Removal | Polymer Type | Tg °C. |
|---|---|---|---|---|---|---|---|---|---|
| 1 (hetero) | 2.77 | 18.4 a | 46 | 2.5 | <1% | <1 ppm | filter | MTD/MNB 90/10 | 138 |
| 2 (batch) | 1.33 | 26.9 a | 138 | 5.13 | <1% | <1 ppm | DMG/filter | MTD/MNB 90/10 | 138 |

TABLE 1-continued

| Example | Mon/1-hexene Mol Ratio | $M_n \times 10^{-3}$ | $M_w \times 10^{-3}$ | $M_w/M_n$ | Total Unsat. (NMR) | Ni ppm | Ni Removal | Polymer Type | $T_g$ °C |
|---|---|---|---|---|---|---|---|---|---|
| 3 (homo) | 2.64 | 42.7 b | 81.7 | 1.91 | 2.32% | 8 ppm | Acid wash | MTD/MNB 90/10 | 144 |
| 4 | 1.32 | 15.8 a | 51.1 | 3.23 | 2.01% | 5 ppm | Acid wash | MTM/MNB 90/10 | 144 |
| 5 | 3.96 | 38.0 a | 103 | 2.72 | 3.28% | 607 ppm | Acid wash | MTD/MNB 90/10 | 145 |
| 6 | 1.30 | 33.0 b | 80.9 | 2.45 | <1% | 83 ppm | Acid wash | MTD/TD/DCPD 4.9/53.3/41.8 | 142 |
| 7 | 1.98 | 42.5 b | 124.0 | 2.91 | <1% | 68 ppm | Acid wash | MTD/TD/DCPD 4.9/53.3/41.8 | 143 |
| 8 | 2.87 | 45.0 b | 132 | 2.94 | <1% | 383 ppm | Acid wash | MTD/TD/DCPD 6.9/50.5/42.5 | 138 |
| 9 | 2.5 | 98.6 b | 228 | 2.31 | 2% | | DMG/filter | TD/DCPD 60(endo TD)/20(exo TD)/20 | 160 |
| 10 | 1.3 | 20.5 a | 61.2 | 2.99 | 1.5% | | DMG/filter | MTD/DCPD/Trimer 71/24/5 | 138 | a) GPC taken in Toluene solvent.
b) GPC taken in TCB solvent

We claim:

1. A process for polymerizing a substantially anhydrous solution in which a processable ring-opened polymer is formed by ring opening metathesis polymerization in at least a first and a last reaction zone of a multi-zoned, single-stage, reaction vessel, said solution including at least one multi-ringed monoolefinically unsaturated cycloolefin monomer selected from the group consisting of bicyclo[2.2.1.]hept-2-ene ("norbornene" "NB") and substituted embodiments thereof, comprising, (a) continuously introducing said monomer into said first reaction zone in combination with (i) a diluent amount of a $C_4$-$C_8$-cycloalkane, and (ii) a minor molar amount, relative to the moles of said monomer, of a lower $C_3$-$C_7$ alkene chain transfer agent present in a predetermined amount correlatable with a desired weight average molecular weight Mw in the range from about 30,000 to about 500,000 of said polymer, and (iii) a catalyst system consisting essentially of a catalyst selected from the group consisting of organoammoniummolybdate, Mo(Cl)$_5$, W(Cl)$_6$, WO(Cl)$_4$, WO(OR)$_{4-x}$Cl$_x$ where R represents alkyl, phenyl, phenyl substituted phenyl, phenylalkyl, and halogen substituted derivatives of alkyl, phenyl, and phenyl substituted phenyl and phenylalkyl; x is an integer in the range from 0 to 4; in combination with an organoaluminumhalide co-catalyst, present in an amount effective to produce said polymer, said co-catalyst being represented by R'$_y$AlCl$_{3-y}$, wherein R' represents $C_2$-$C_6$ alkyl; y is an integer in the range from 0 to 3, or an alkyltin hydride represented by R''$_3$SnH where R'' is $C_2$-$C_6$ alkyl; at a pressure in the range from about atmospheric (1 bar) to about 6 bar (90 psig);

(b) maintaining said at least first and second zones in restricted, substantially one-way fluid communication, one zone with a contiguous zone;

(c) maintaining said last reaction zone at a higher temperature than a contiguous preceding reaction zone, said higher temperature being at least 20° C. higher than in said preceding reaction zone, and said last reaction zone is at a temperature in the range from 23° C.-55° C.;

(d) controlling only the amount of said catalyst system and said $C_3$-$C_7$ alkene relative to said monomer so as to convert >95% of said monomer in less than 20 min residence time through said reaction vessel, yet continuously maintaining a temperature in a chosen range in each reaction zone; and, (e) recovering a polymer from said last reaction zone, said polymer having a $M_w/M_n <5$ and a $T_g$ in the range from about 135° C.-200° C.

2. The process of claim 1 comprising, in addition, continuously agitating each said reaction zone;
said catalyst is selected from the group consisting of Mo(Cl)$_5$, W(Cl)$_6$ and WO(Cl)$_4$;
said co-catalyst is an alkylaluminumhalide;
said catalyst and co-catalyst are together present in an amount sufficient to convert >99% of said monomer to said polymer; and,
said lower $C_3$-$C_7$ α-olefin chain transfer agent is selected from the group consisting of butene, 1-pentene and 1-hexene present in an amount in the range from about 10-80 mol per cent based on the mols of said monomer present.

3. The process of claim 2 wherein, said polymer is a homopolymer, and, said monomer is selected from the group consisting of tetracyclododecene, 5-ethylidenyl 2-tetracyclododecene and 9-($C_1$-$C_3$)alkyltetracyclododecene.

4. The process of claim 2 wherein at least one said monomer is selected from the group consisting of tetracyclododecene and a 9-($C_1$-$C_3$)alkyltetracyclododecene, and said polymer is a copolymer.

5. The process of claim 3 wherein said 9-($C_1$-$C_3$)alkyltetracyclododecene is selected from the group consisting of methyltetracyclododecene and ethyltetracyclododecene.

6. The process of claim 4 wherein at least one said monomer is cyclopentadiene trimer and the amount thereof is limited to an amount which contributes 1% by weight of symmetrical trimer relative to the weight of other cycloolefin monomers present.

7. The process of claim 6 wherein at least one said monomer is dicyclopentadiene present in an amount in excess of 35% by weight, and said cyclopentadiene trimer is present in an amount in the range from 1-5% by weight.

8. The process of claim 6 wherein at least one said monomer is tetracyclododecene present in an amount in the range from 40-60% by weight, having an exo-component in the range of 10-20% of the TD present, the remainder being another monomer selected from the group consisting of dicyclopentadiene and 9($C_1$–$C_3$)alkyltetracyclododecene.

9. The process of claim 2 comprising controlling temperature in each said reaction zone by controlling the rate of addition of said catalyst, said co-catalyst and said $C_3$–$C_7$ alkene to each said zone; sufficient catalyst is added whereby in 1 mol of catalyst makes at least 1000 mols, and up to 10,000 mols of (co)polymer; and, said $M_w/M_n$ is in the range from 1.3 to 5.

10. A process for continuously producing an unpolished unsaturated copolymer of particular tricyclic and tetracyclic comonomers containing a norbornene moiety, which copolymer is a precursor of a processable optical grade copolymer, said process comprising,
  (a) introducing into a first zone of a multi-zoned single-stage continuously agitated reaction zone at a pressure in the range from about atmospheric (1 bar) to about 6 bar (90 psig) and at a first temperature in the range from about 70°–90° C., (i) at least 35% by weight of DCPD, at least 10% by wt of trimer including symmetrical trimer, any remaining monomer being selected from the group consisting of TD and substituted TD, in a desired molar ratio;
  (ii) a diluent amount of a $C_4$–$C_8$-cycloalkane; and
  (iii) a ring-opening metathesis polymerization (ROMP) system;
  (b) adding a minor molar amount, relative to the moles of said monomer, of a $C_4$–$C_7$ alkene chain transfer agent in said first zone, in an amount sufficient to initiate reaction of >95% of said comonomers therein and to provide a desired weight average molecular weight Mw in the range from about 30,000 to about 500,000 of said polymer,
  (c) continuously transferring a portion of the reaction mixture in said first zone to a contiguous successive zone in restricted, one-way fluid communication with said first zone, said successive zone being autogenously maintained at a second temperature in the range from 75°–120° C.; and,
  (d) withdrawing a copolymer from the single-stage reaction zone, from the last zone thereof, the copolymer having a $M_w/M_n<5$ and a $T_g$ in the range from 135° C.– 200° C.

* * * * *